United States Patent Office 3,192,276
Patented June 29, 1965

3,192,276
ALKYLATION OF INDENE
Henry E. Fritz, Charleston, W. Va., assignor to Union Carbide Corporation, a corporation of New York
No Drawing. Filed Sept. 10, 1962, Ser. No. 222,689
14 Claims. (Cl. 260—668)

This invention relates to the alkylation of indene. More particularly, this invention relates to a process for the alkylation of indene in the 1 and 3 positions which comprises reacting indene, or a substituted indene, with a primary or secondary alcohol in the presence of a highly alkaline metal hydroxide.

According to the process of the instant invention, an indene compound is reacted with a primary or secondary alcohol in the presence of a highly alkaline metal hydroxide, such as potassium hydroxide or sodium hydroxide. The indene compound is alklated first in the 1 position, and then in the 3 position. Alkylation of indene in the 3 position is entirely unexpected because this position is not the site of an active methylene group as in the 1 position, and therefore would not be expected to react under the conditions of the reaction. The reaction proceeds in the manner depicted by the following graphic equations:

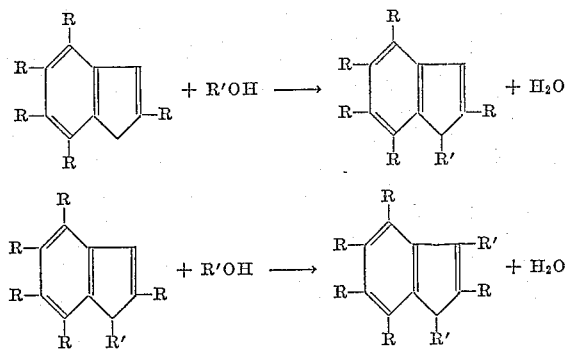

wherein each R is individually a radical selected from the group consisting of hydrogen and hydrocarbon radicals free of aliphatic unsaturation having from 1 to 15 carbon atoms, preferably from 1 to 6 carbon atoms, and R' is a primary or secondary alkyl radical having from 1 to 20 carbon atoms, preferably from 1 to 12 carbon atoms. When R is a hydrocarbon radical, it is preferably an alkyl radical.

In order to effect reaction between an indene compound and a primary or secondary alcohol according to the process of the instant invention, the presence of a highly alkaline metal hydroxide, or other strongly alkaline material, in the reaction mixture is necessary. The metal hydroxide is preferably selected from the group consisting of sodium hydroxide and potassium hydroxide, although any other highly alkaline metal hydroxide, such as rubidium hydroxide or cesium hydroxide can also be employed. The metal hydroxide can be employed in an amount from as low as about 0.009 mole percent to as high as about 200 mole percent, preferably from about 5 mole percent to about 50 mole percent, of the indene compound employed, or the hydroxide can be employed in strictly catalytic amounts if desired. Amounts of the metal hydroxide of from about 0.009 mole percent to about 20 mole percent, preferably from about 0.1 mole percent to about 5 mole percent, of the indene compound employed, are completely satisfactory.

The indene compounds employed as starting materials can be depicted by the general formula:

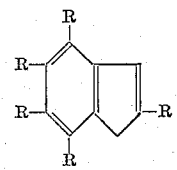

wherein each R is as above defined. Illustrative of such starting materials are such compounds as 2-methylindene, 4-methylindene, 5-ethylindene, 6-isopropylindene, 7-isobutylindene, 2,4-dimethylindene, 4,6-dimethylindene, 2-phenylindene, 2-m-tolylindene, 2,6-diphenylindene, 4,6-dihexylindene, 2-decylindene, 5-dodecylindene, 6-pentadecylindene, and the like.

The primary and secondary alcohols employed as starting materials can be depicted by the general formula R'OH wherein R' is as above defined. Illustrative of such starting materials are such compounds as methanol, ethanol, n-propanol, isopropanol, n-butanol, n-pentanol, 3-ethyl-2-pentanol, 5 - ethyl - 2 - nonanol, cyclopentanol, n-hexanol, cyclohexanol, 2-ethylhexanol, n-heptanol, cycloheptanol, n-octanol, n-nonanol, n-decanol, isodecanol, n-pentadecanol, 6-pentadecanol, n-eicosanol, and the like.

When effecting reaction according to the process of the instant invention, it is preferable to employ a substantial excess of alcohol over the stoichiometric amount required in order to effect complete reaction of the more expensive indene. Amounts of alcohol of from 1 to 10 times the stoichiometric equivalent are preferred for this purpose, but amounts of from as little as 0.1 mole to as much as 100 moles of alcohol per mole of indene compound present can also be employed. When an excess of alcohol is employed, the alcohol acts as a solvent as well as functioning as a reactant.

Reaction according to the process of the instant invention readily occurs at temperatures ranging from as low as about 150° C. to as high as about 350° C., but is preferably effected at temperatures ranging from about 180° C. to about 250° C.

Autogenous pressure is usually employed in effecting reaction according to the process of the instant invention. When the alcohol employed has a boiling point above the temperature at which reaction is effected, the reaction can be run at atmospheric pressure or below. In general, the pressure can range from as low as about 0.5 atmosphere to as high as about 200 atmospheres, with the most suitable pressures ranging from about 1 atmosphere to about 50 atmospheres.

The reaction time is not narrowly critical, but longer reaction times usually result in greater yields of the dialkylated product as compared to the monoalkylated product, provided other reaction conditions are kept constant. Reaction times of from about 0.5 to about 10 or more hours, preferably from about 1 to about 2 hours, are satisfactory for batch operations.

The alkylated indene compounds produced by the process of the instant invention can be recovered from the reaction mixture by conventional techniques. These products can be hydrogenated to produce high temperature fuels, as is known in the art.

The following examples are set forth for purposes of illustration so that those skilled in the art may better understand this invention, and it should be understood that they are not to be construed as limiting this invention in any manner.

EXAMPLE I

*Preparation of 1,3-bis(2-ethylhexyl)indene*

A one-liter flask equipped with a stirrer, a thermometer, and a reflux condenser having a decanter type trap was charged with 100 grams of 97 percent by weight indene (0.83 mole), 500 milliliters of 2-ethylhexanol (4.1 moles), and 25 grams of 85 percent by weight potassium hydroxide (0.38 mole). The resulting mixture was heated at its refluxing temperature for twelve hours with stirring while water produced by the reaction was removed by means of the decanter trap. At the end of this time, the reaction mixture was cooled and diluted with 250 milliliters of isopropyl ether. The resulting mixture was washed five times with 500 milliliter portions of water and distilled. About 212 grams of crude 1,3-bis(2-ethylhexyl)indene (0.623 mole) were collected. This represented a yield of the crude product of 75 percent of theoretical. A portion of the crude product was redistilled and the fraction boiling at a temperature of 166 to 168° C. at 0.4 mm. Hg pressure was collected. The redistilled product had an index of refraction of 1.5102 at 20° C., and a molecular weight of 330 (calculated, 340.6), as determined by the freezing point depression of benzene. The infrared absorption spectrum of this product was found to be consistent with that of 1,3-bis(2-ethylhexyl)indene. The product was further identified by chemical analysis. *Analysis.*—Calculated for $C_{25}H_{40}$: C, 88.16%; H, 11.84%. Found: C. 88.15%; H, 11.88%.

EXAMPLE II

*Preparation of isopropylindene*

A three-liter stainless steel rocking autoclave was charged with 350 grams of 97 percent by weight indene (2.92 moles), 180 grams of isopropanol (3.0 moles), and 100 grams of 85 percent by weight potassium hydroxide (1.5 moles). The autoclave was sealed and heated to a temperature of 226° C. over a one hour period, and then maintained at a temperature of 226° C. to 254° C. for ten hours. At the end of this time, the reaction mixture was cooled and diluted with 500 milliliters of isopropyl ether. The resulting mixture was then washed three times with one-liter portions of water. The ether was evaporated from the mixture and the residue was distilled. About 126 grams of crude isopropylindene (0.80 mole), boiling at a temperature of 64° C. to 77° C. at 2 mm. Hg pressure, were collected. This represented a yield of the crude product of 27 percent of theoretical. Redistillation of the crude product gave a colorless liquid boiling at 101° C. to 103° C. at 10 mm. Hg pressure. The redistilled product had an index of refraction of 1.5451 at 20° C., and a molecular weight of 162 (calculated, 158.2), as determined by the freezing point depression of benzene.

EXAMPLE III

*Preparation of 1,3-bis(cyclohexyl)indene*

A three-liter stainless steel rocking autoclave was charged with 116 grams of 97 percent by weight indene (0.97 mole), 500 grams of cyclohexanol (5.0 moles), and 50 grams of 85 percent by weight potassium hydroxide (0.76 mole). The autoclave was sealed and heated to a temperature of 230° C. over a one hour period, and then maintained at a temperature of 230±4° C. for ten hours. At the end of this time, the reaction mixture was diluted with one liter of water and filtered to remove traces of solid impurities. The filtrate obtained from the filtration separated into two distinct phases on standing. The upper alcohol phase was separated and washed with 500 milliliters of water, with 2 grams of sodium chloride being added to break the resulting emulsion. The aqueous wash was combined with the lower aqueous phase and the resulting solution was extracted with 500 milliliters of isopropyl ether. The ether extract was combined with the alcohol phase. The combined phases were washed with water several times until the wash water was neutral to pH paper, with 2 to 3 grams of sodium chloride being added each time to break the resulting emulsion. The solution was then distilled, and 74 grams of 1,2-bis(cyclohexyl)indene (0.264 mole), boiling at a temperature of 168° C. to 169° C. at 0.6 mm. Hg pressure, were collected. This represented a yield of 27.3 percent of theoretical. The product had an index of refraction of 1.5609 at 20° C., and a molecular weight of 273 (calculated, 280.4), as determined by the freezing point depression of benzene. The product was identified by elemental analysis. *Analysis.*—Calculated for $C_{21}H_{28}$: C, 89.94%; H, 10.06%. Found: C, 89.68%; H, 10.12%.

What is claimed is:

1. A process for producing 1,3-alkylindenes represented by the general formula

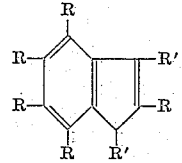

wherein each R is individually a radical selected from the group consisting of hydrogen and hydrocarbon radicals free of aliphatic unsaturation having from 1 to 15 carbon atoms, and R' is a radical selected from the group consisting of primary and secondary alkyl having from 1 to 20 carbon atoms, which comprises reacting an indene compound represented by the general formula

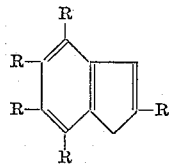

wherein each R is as above defined, with an alcohol represented by the general formula R'OH wherein R' is as above defined, in contact with a highly alkaline metal hydroxide.

2. A process as in claim 1 wherein the highly alkaline metal hydroxide is selected from the group consisting of sodium hydroxide and potassium hydroxide.

3. A process for producing 1,3-alkylindenes represented by the general formula

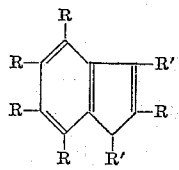

wherein each R is individually a radical selected from the group consisting of hydrogen and alkyl radicals having from 1 to 6 carbon atoms, and R' is a radical selected from the group consisting of primary and secondary alkyl having from 1 to 12 carbon atoms, which comprises reacting an indene compound represented by the general formula

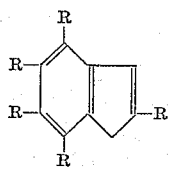

wherein each R is as above defined, with an alcohol represented by the general formula R'OH wherein R' is as above defined, in contact with a highly alkaline metal hydroxide.

4. A process as in claim 3 wherein the highly alkaline metal hydroxide is selected from the group consisting of sodium hydroxide and potassium hydroxide.

5. A process for producing 1,3-alkylindenes which comprises reacting indene with an alcohol represented by the general formula R'OH wherein R' is a radical selected from the group consisting of primary and secondary alkyl having from 1 to 12 carbon atoms, in contact with a highly alkaline metal hydroxide.

6. A process as in claim 5 wherein the highly alkaline metal hydroxide is selected from the group consisting of sodium hydroxide and potassium hydroxide.

7. A process for producing 1,3-bis(2-ethylhexyl)indene which comprises reacting indene with 2-ethylhexanol in contact with a highly alkaline metal hydroxide.

8. A process as in claim 7 wherein the highly alkaline metal hydroxide is selected from the group consisting of sodium hydroxide and potassium hydroxide.

9. A process for producing 1,3-bis(isopropyl)indene which comprises reacting indene with isopropanol in contact with a highly alkaline metal hydroxide.

10. A process as in claim 9 wherein the highly alkaline metal hydroxide is selected from the group consisting of sodium hydroxide and potassium hydroxide.

11. A process for producing 1,3-bis(cyclohexyl)indene which comprises reacting indene with cyclohexanol in contact with a highly alkaline metal hydroxide.

12. A process as in claim 11 wherein the highly alkaline metal hydroxide is selected from the group consisting of sodium hydroxide and potassium hydroxide.

13. 1,3-bis(2-ethylhexyl)indene.

14. 1,3-bis(cyclohexyl)indene.

References Cited by the Examiner

UNITED STATES PATENTS 3,104,268   9/63   Kovach _____ 260—668 X

ALPHONSO D. SULLIVAN, *Primary Examiner.*